May 13, 1930.  J. METTLER  1,758,673
INDUCTION METER
Filed Dec. 19, 1927
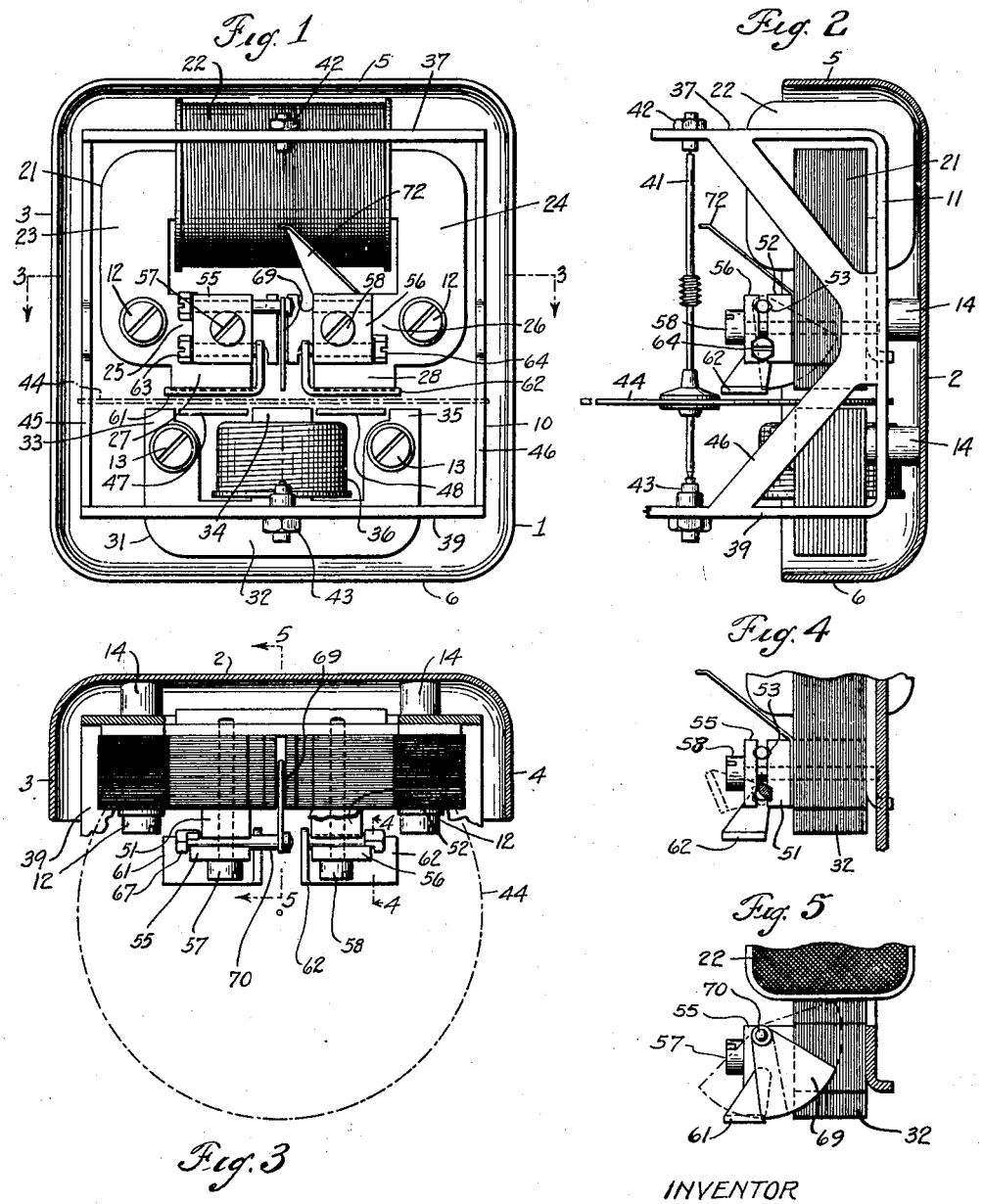
INVENTOR
Josef Mettler
BY John A. Morgan
ATTORNEY Patented May 13, 1930

1,758,673

UNITED STATES PATENT OFFICE

JOSEF METTLER, OF ZUG, SWITZERLAND, ASSIGNOR TO LANDIS & GYR, A.-G., A LIMITED JOINT-STOCK COMPANY OF SWITZERLAND

INDUCTION METER

Application filed December 19, 1927, Serial No. 241,117, and in Switzerland December 24, 1926.

The invention relates to novel and useful improvements in induction electricity meters, and more especially to novel and useful improvements in various structural features of such meters, including improvement mountings for phase displacement and friction compensating devices.

Objects and advantages of the invention will be set forth in part hereinafter and in part will be obvious herefrom, or may be learned by practice with the invention, the same being realized and attained by means of the instrumentalities and combinations pointed out in the appended claims.

The invention consists in the novel parts, constructions, arrangements, combinations and improvements herein shown and described.

The accompanying drawings, referred to herein and constituting a part hereof, illustrate one embodiment of the invention, and together with the description, serve to explain the principles of the invention.

Of the drawings:—

Fig. 1 is an elevation of a meter embodying the invention, with the front of the meter case removed and certain parts omitted;

Fig. 2 is a side elevation corresponding to Fig. 1, with the side of the casing cut off;

Fig. 3 is a horizontal section on line 3—3 of Fig. 1, with parts omitted;

Fig. 4 is a fragmentary section on line 4—4 of Fig. 3; and

Fig. 5 is a fragmentary section of the central part of the meter taken on line 5—5 of Fig. 3.

The invention is directed to providing an induction meter of very simple, sturdy and compact construction, which is easy to assemble and with the parts readily accessible. The invention is further directed to improved forms of compensating devices for variations in phase displacement and of friction compensation or light load adjustment, which is of simple structure, accessible and easily operated and capable of nice and positive adjustment.

In the present preferred embodiment of the invention, as exemplarily illustrated in the drawings, a casing 1 is provided having a back 2, side walls 3 and 4, a top 5 and a bottom wall 6. The meter mechanism is mounted in a frame 10, mounted within the casing 1. The frame 10 comprises a flat back portion 11, fixed to but spaced away from the back wall 2 of the casing by screws 12, 12 and 13, 13 and cooperating spacing collars 14 interposed between the back 11 of the frame and the interior of the back wall of the casing. The screws 12, 12 also pass through the pressure core, thereby assembling the core, frame and casing. The screws 13, 13 in like manner pass through the current core, the frame and casing and assemble and hold them together. Collars or lugs 14 are provided also for spacing the pressure and current cores away from the inside of the back 11 of the frame 10. The collars or lugs 14 are preferably spot welded to the casing and the screws 12 and 13 are screw-threaded into these collars.

The embodied form of pressure core 21 has a top horizontally-disposed reach which carries the pressure coil 22, and downwardly-extending reaches 23 and 24 at either side, the two ends 25 and 26 of the core extending horizontally toward each other and terminating with a small air gap between their ends as shown in Figs. 1 and 3. The pressure core in this form is somewhat similar to a horizontally positioned C. Two pole pieces 27 and 28 extend downwardly from the respective poles toward the meter disc.

The embodied current core 31 comprises a horizontally-disposed bottom portion 32 and three upwardly-extending arms 33, 34 and 35, the current coil 36 being wound on the central arm 34 of the core. This form of current core is approximately of the shape of a horizontal E, with the center arm constituting one pole and the outer arms being poles of opposite sign. The center pole of the current core is opposite and between the pressure core poles, and the outer poles of the current core are opposite but outside the pressure core poles.

Referring further to the form and relation of the frame and the various parts of the meter mechanism, the frame at the top of the back 11 is bent forwardly to form an outwardly-extending, horizontally-disposed plate 37, this top plate and the back 11 being internally cut away to permit the pressure coil 22 to project therethrough, leaving only a slight clearance between the coil and the casing, as shown in Figs. 1 and 2.

At the bottom, the frame is bent to form an outwardly-extending and horizontally-disposed part 39, this part and the back being internally recessed at and adjacent to their juncture, to permit the current core and coil to project therethrough, leaving a slight clearance between them and the frame, as appears from Figs. 1 and 2. The meter spindle 41 is provided with bearings 42 and 43 in the parallel top and bottom extensions of the frame 37 and 39, the meter disc 44 being in the usual relation to the poles. The meter frame may have side braces 45 and 46. Two lag plates 47 and 48 are stamped out and bent forward from the back 11 of the frame, as shown in Fig. 1. The foregoing embodiment provides a meter having a very simple, sturdy and compact structure, which may be assembled with great facility and which is very accessible for regulation and other purposes.

Referring now to the present preferred embodiment of the positioning means for the phase displacement compensating means and the light load adjustment, they are preferably combined in a single structure and are accordingly so shown. In this general structure blocks 51 and 52 are mounted on the front of the lower horizontal reaches 25 and 26 of the pressure core, and these blocks are both provided with top and bottom horizontally-disposed angular or partially cylindrical clamping grooves 53, formed in their outer faces, as best shown in Figs. 2 and 4. Outside of and spaced away from the outer faces of blocks 51 and 52 are clamping plates 55 and 56 having corresponding grooves 53 in register with those in the blocks 51 and 52, respectively. A screw 57 passes through block 51 and its clamping plate 55, and a screw 58 passes through block 52 and its clamping plate, both screws being screw-threaded into the pressure core. These screws press the clamping plates and their blocks together so as to exert just the requisite pressure on the supports for the compensating devices, which are held in the grooves 53, so that they may be readily positioned by a single, simple movement and will then remain securely and exactly as so positioned or adjusted.

The friction compensators comprise angled iron plates 61 and 62, one part of each being movable into and out of position between the corresponding pressure poles 27 and 28 and the meter disc. The other part of plate 61 extends upwardly, and fixed thereto is a pin 63, which lies in the lower grooves 53 formed in block 51 and its clamping plate 55. The plate 62 has likewise an upwardly extending part, to which is fixed a pin 64, which lies in the lower grooves 53 formed in block 52 and its clamping plate 56. The pins 63 and 64 have slotted heads, whereby they may be rotated by a screw driver or other tool.

Means are provided for limiting the movement of the compensators to prevent their contacting with other parts of the mechanism. As embodied, each pin is provided with a shoulder 67 in the inner end of its head (see Figs. 3 and 4) and each clamping plate 55 and 56, extends out sidewise beyond the corresponding blocks 51 and 52 (see Fig. 3). Thus the shoulders 67 in the heads of the pins will engage with the ends of the respective clamping plates, and thereby limit the movement of the corresponding pin to a partial rotation, and the corresponding movement of the friction compensating plates 61 and 62 between the full and dotted line positions of Fig. 4, or other desired or predetermined positions. It will be recalled that screws 57 and 58 are turned so as to exert tight holding friction on pins 63 and 64 while permitting rotation thereof to position the plates 61 and 62, the pins thereafter being held firmly and exactly in position.

The embodied phase displacement compensating means comprises a copper plate 69, movable in the air gap between the poles of the pressure core. Plate 69 is fixed on a pin 70, mounted in the upper pair of grooves 53 in plate 55 and block 51. Pin 70 has the slotted and shouldered head, as already described and for the same purposes. Thereby the positions of plate 69 may be limited between the full line and dotted line positions of Fig. 5, or other desired positions, and it is held firmly and exactly in the desired position. The upper grooves 53 on the right hand side in Fig. 1 are occupied by an idle pin, which acts as a spacing device. The positioning means for the various compensating devices are exceedingly accessible, are simple and positive in operation and may be operated with ease, nicety and sureness. An anti-creeping device 72 is preferably mounted on screw 58 between block 52 and the pressure core, and extends upwardly and outwardly toward the meter spindle 41.

The invention in its broader aspects is not limited to the specific mechanisms shown and described but departures may be made therefrom within the scope of the accompanying claims without departing from the principles of the invention and without sacrificing its chief advantages.

What I claim is:—

1. In an induction meter, a pressure coil and core, a current coil and core, a plurality of closely adjacent, rotatable compensating devices for friction and phase compensation mounted on said pressure core and a single means for frictionally holding said compensating devices in adjusted position.

2. In an induction meter, a pressure coil and core, a current coil and core, a plurality of closely adjacent, rotatable compensating devices for friction and phase compensation mounted on said pressure core, a single means for frictionally holding said compensating devices in adjusted position, and means for limiting the movement of said compensating devices.

3. In an induction meter, a pressure coil and core, a current coil and core, a plurality of closely adjacent, rotatable compensating devices for friction and phase compensation mounted on said pressure core, a single means for frictionally holding said compensating devices in adjusted position, said compensating devices being mounted to prevent their contact with the meter disc in any of the positions to which they can be moved.

In testimony whereof, I have signed my name to this specification.

JOSEF METTLER.